United States Patent
Döll et al.

(10) Patent No.: US 6,546,310 B1
(45) Date of Patent: Apr. 8, 2003

(54) PROCESS AND DEVICE FOR CONTROLLING A METALLURGICAL PLANT

(75) Inventors: Rüdiger Döll, Nürnberg (DE); Otto Gramckow, Uttenreuth (DE); Günter Sörgel, Nürnberg (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/554,171

(22) PCT Filed: Oct. 27, 1998

(86) PCT No.: PCT/DE98/03142

§ 371 (c)(1),
(2), (4) Date: Jul. 6, 2000

(87) PCT Pub. No.: WO99/24182

PCT Pub. Date: May 20, 1999

(30) Foreign Application Priority Data

Nov. 10, 1997 (DE) ......................... 197 49 460
Feb. 16, 1998 (DE) ......................... 198 06 267

(51) Int. Cl.$^7$ .............................................. G06F 19/00
(52) U.S. Cl. .................... 700/150; 700/176; 700/40
(58) Field of Search ................................ 700/146, 147, 700/148, 175, 40, 43, 50; 148/307, 551, 552

(56) References Cited

U.S. PATENT DOCUMENTS

| | | | | |
|---|---|---|---|---|
| 3,981,752 A | * | 9/1976 | Kranenberg et al. | 148/320 |
| 4,434,003 A | * | 2/1984 | Geskin | 73/597 |
| 5,976,279 A | * | 11/1999 | Selepack et al. | 148/551 |
| 5,993,573 A | * | 11/1999 | Selepack et al. | 148/551 |

FOREIGN PATENT DOCUMENTS

| | | |
|---|---|---|
| DE | 44 16 317 | 11/1994 |
| DE | 197 38 943 | 3/1999 |
| WO | WO 98/18970 | 5/1998 |

OTHER PUBLICATIONS

J. Andorfer et al., "Controlling the Mechanical Properties of Hot Rolled Strip", MPT International, May 1997, pp. 104–110.

D. Auzinger et al., "VAI's New Efficient Soulution for Controlling the Mechanical Properties of Hot Rolled Strip", IEEE Industry Applications Society Annual Meeting, New Orleans Oct. 5–9, 1997, pp. 2131–2136.

D. Auzinger et al., "Advanced Process Models for Today's Hot Strip Mills", SEAISI 1995 Conference of the South East Asia Iron and Steel Institute, vol. 18, No. 6, May 22–24, 1995, pp. 58–64.

K.P. Düfert et al., "Berechnung der Gefügeentwicklung un der Mechanischen Eigenschaften beim Warmwalzen", Stahl and Eisen, vol. 112, No. 10, Oct. 16, 1992, pp. 93–98*.

T. Heller et al., "Rechnersimulation der Warmumformung und der Umwandlung am Beispiel der Warmbanderzeugung", Stahl and Eisen, vol. 116, No. 4, Apr. 15, 1996*.

(List continued on next page.)

Primary Examiner—Leo Picard
Assistant Examiner—Kidest Bahta
(74) Attorney, Agent, or Firm—Baker Botts LLP

(57) ABSTRACT

A process for controlling a metallurgical plant for producing steel or aluminum, in particular a rolling mill, steel or aluminum having specific material properties that depend on the structure of the steel or aluminum being produced in the metallurgical plant from input materials, and the material properties of the steel or aluminum being a function of operating parameters with which the plant is operated, the operating parameters being determined by a structure optimizer as a function of the desired material properties of the steel or aluminum.

10 Claims, 4 Drawing Sheets

OTHER PUBLICATIONS

Patent Abstracts of Japan, vol. 16, No. 515 (M–1329), Oct. 23, 1992 & JP 04 190910 (Toshiba Corp.), Jul. 9, 1992.

Patent Abstracts of Japan, vol. 12, No. 219 (C–506), Jun. 22, 1988 & JP 63 014813 A (Nippon Steel Corp.), Jan. 22, 1988.

Patent Abstracts of Japan, vol. 16, No. 147 (P–1336), Apr. 13, 1992 & JP 04002957 A (Nippon Steel Corp.), Jan. 7, 1992.

Patent Abstracts of Japan, vol. 96, No. 8, Aug. 30, 1996 & JP 08 092654 A (Sumitomo Metal Ind. Ltd.), Apr. 9, 1996.

J.J.M. Too, et al., "An AI System for the Prediction of Flow Response in Hot Working", $37^{th}$ MWSP Conf. Proc., ISS, vol. XXXIII, 1996, pp. 785–790.

B. Filipic et al., "Optimizacija procesnih parametrov pri kontinuiranem ulivanju jekla v zelezarni ACRONI Jesenice", Kovine, zlitine, technologije, 1997, pp. 391–395**.

C.M. Sellers et al., "Recrystallization and Grain Growth in Hot Rolling", Material Science, Mar./Apr. 1979, pp. 187–193.

* cited by examiner

PROCESS AND DEVICE FOR CONTROLLING A METALLURGICAL PLANT

PRESENT FIELD OF THE INVENTION

The invention relates to a process and a device for for producing steel or aluminum, in particular for controlling a rolling mill for producing a rolled strip of steel or aluminum having specific material properties that depend on the structure of the steel or aluminum being produced from input materials. The material properties of the steel or aluminum are a function of operating parameters with which the plant is operated. The present invention also relates to the associated device for implementing the process.

BACKGROUND INFORMATION

The appropriate operating parameters are normally set by an operator of the metallurgical plant in such a way that the material properties of the steel or aluminum correspond to desired, predefined material properties. For this purpose, the operator usually has recourse to empirical knowledge which is stored, for example, in table form.

SUMMARY

The object of an present invention is to provide a process and a device for implementing the process which make it possible to produce steel or aluminum whose material properties correspond more precisely to the material properties desired in advance.

According to the present invention, the objective is achieved by providing a process according to and a device in which, the operating parameters are determined by a structure optimizer as a function of the desired material properties of the steel or aluminum. In so doing, material properties such as yield point, proof stress, tensile strength, elongation at fracture, hardness, transition temperature, anisotropy and consolidation index of the steel or aluminum are particularly advantageously considered. The process of the present invention permits operating parameters of a metallurgical plant to be set in such a way that the steel or aluminum produced has the desired material properties.

In an advantageous refinement of the present invention, the structure optimizer has a structure observer which predicts the material properties of a steel or aluminum produced in a metallurgical plant as a function of its operating parameters. A structure observer of this type advantageously has a neural network.

In a further advantageous refinement of the present invention, the structure optimizer determines at least one of the variables: yield point, proof stress, tensile strength, elongation at fracture, hardness, transition temperature, anisotropy and consolidation index of the steel or aluminum as a function of the temperature, the degree of deformation or the relative deformation of the steel, the deformation speed and the alloying components of the steel.

In another advantageous refinement of the process according to the invention, the structure observer determines at least one of the variables: yield point, proof stress, tensile strength, elongation at fracture, hardness, transition temperature, anisotropy and consolidation index of the steel to be examined as a function of the individual alloying components in the steel. In this case, it has been shown to be particularly advantageous to determine at least one of the variables: yield point, proof stress, tensile strength, elongation at fracture, hardness and transition temperature as a function of the carbon portion, of the silicon portion, of the manganese portion, of the phosphorus portion, of the sulphur portion, of the cobalt portion, of the aluminum portion, of the chromium portion, of the molybdenum portion, of the nickel portion, of the vanadium portion, of the copper portion, of the tin portion, of the calcium portion, of the titanium portion, of the boron portion, of the niobium portion, of the arsenic portion, of the tungsten portion and of the nitrogen portion.

In a simple advantageous refinement of the present invention, the structure observer determines at least one of the variables yield point, proof stress, tensile strength, elongation at fracture, hardness, transition temperature, anisotropy and consolidation index of the steel to be examined as a function of the portion of carbon in the steel or of the carbon equivalent or of the useful and/or pollutant portions.

DETAILED DESCRIPTION

Figure 1:
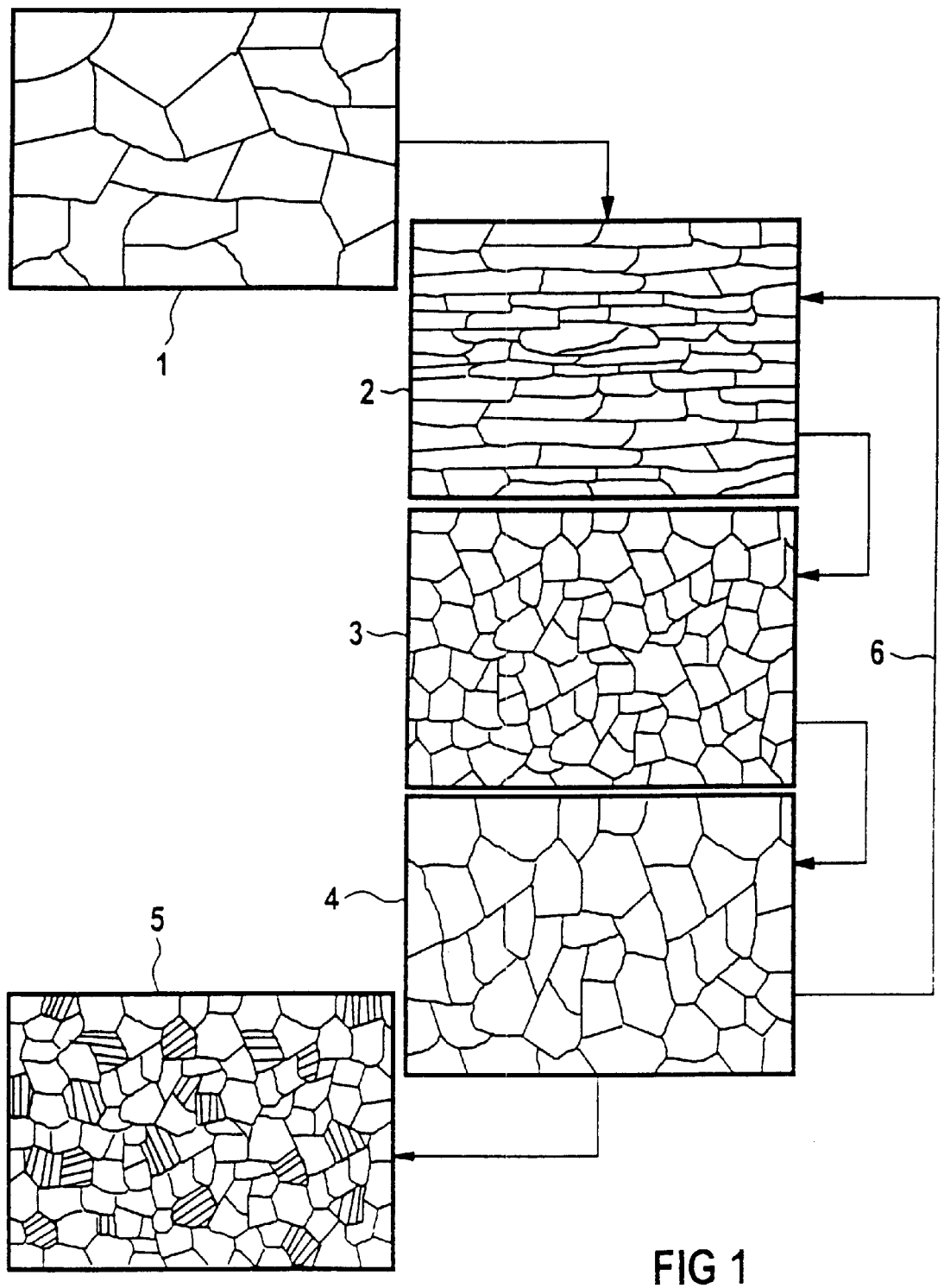
FIG. 1 shows the change in the structure of steel during rolling.

FIG. 1 shows the change in the structure of steel during rolling. The steel runs into the rolling train with a structure according to block 1. After passing through the first roll stand, grains stretched by rolling have been formed in accordance with block 2. In this state, so-called recovery occurs, during which dislocations and hence stress within individual grains of the structure are reduced. Due to recrystallization, new, low-dislocation grains are formed, starting from the grain boundaries, as indicated by block 3. The recrystallization is designated as dynamic recrystallization or as static recrystallization depending on whether new grains are formed while the material is still in the roll stand or only thereafter. Subsequently, following the recrystallization and depending on the temperature, grain growth occurs, larger grains growing at the expense of smaller grains, as in block 4. Iteration loop 6 sketches the use of a plurality of roll stands in a rolling train, or the repeated passing of rolling stock through a reversing stand. The operation illustrated in blocks 2, 3 and 4 is repeated in principle during each rolling, however always starting from the microstructure following the preceding rolling operation. After rolling and subsequent cooling have been completed, a microstructure according to block 5 has been formed. This microstructure has specific material properties, such as specific values for yield point, proof stress, tensile strength, elongation at fracture, hardness, anisotropy and consolidation index. Starting from values defined in advance for yield point, proof stress, tensile strength, elongation at fracture, hardness, transition temperature, anisotropy and/or consolidation index of the metal, in particular steel or aluminum, a rolling train (and/or a continuous casting installation) is adjusted in such a way that, at the end, a microstructure having the desired values for yield point, proof stress, tensile strength, elongation at fracture, hardness, transition temperature, anisotropy and/or consolidation index is established. This is carried out with the aid of a structure optimizer, as illustrated in FIG. 2.

Figure 2:
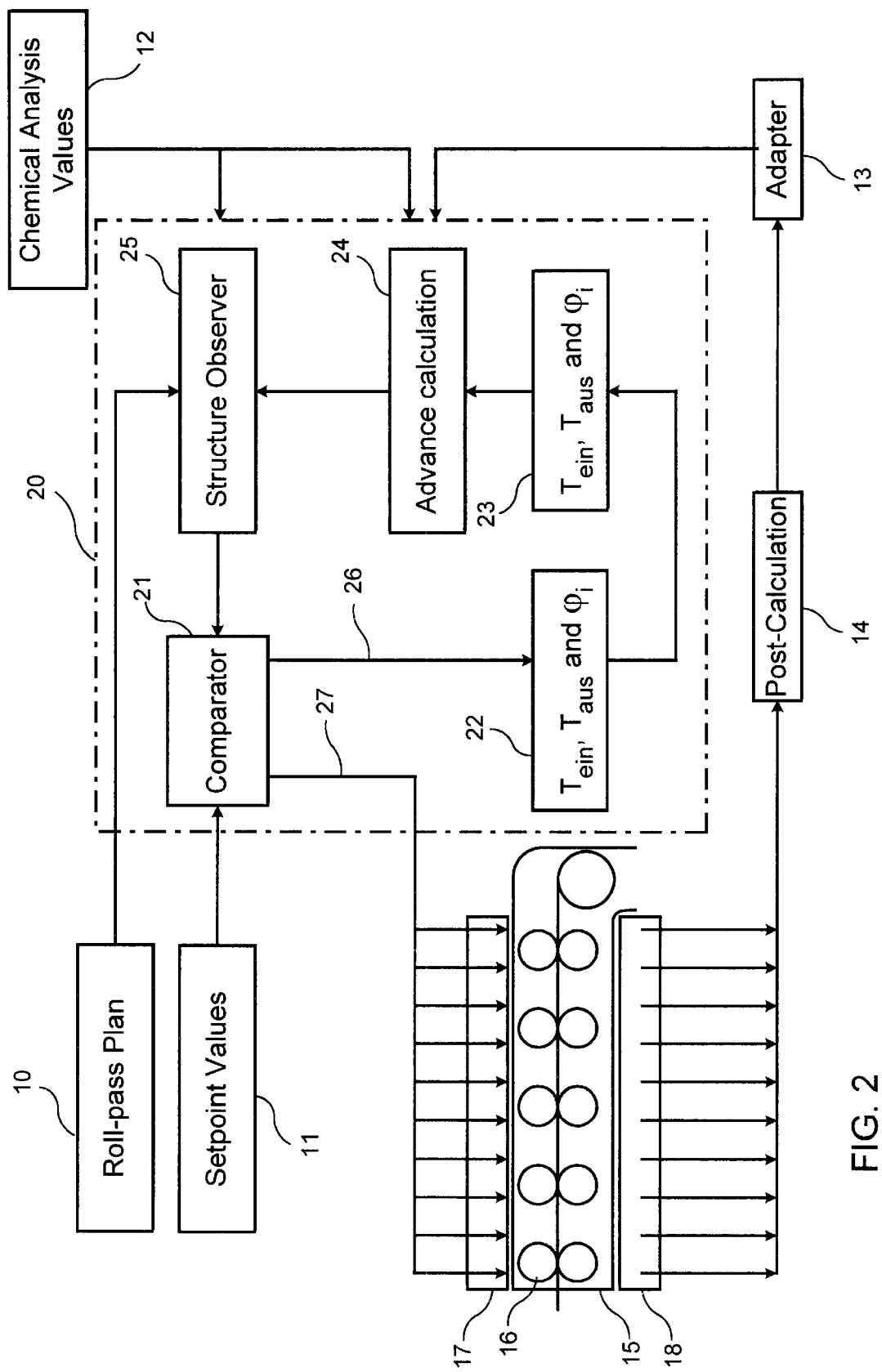
FIG. 2 shows the integration of a structure optimizer into the control of a rolling train.

In FIG. 2, reference numeral 15 designates a rolled strip in a rolling train 16, the intention being for the material or working properties of the rolled strip following rolling to correspond to setpoint values 11 for the material or working properties. Control elements 17 are provided for influencing the rolling train. Furthermore, measuring instruments 18 are provided for measuring specific states of the rolling train. The operating parameters of rolling train 16, which are set using control elements 17, are ascertained by a structure optimizer 20. Structure optimizer 20 has a structure observer 25 which ascertains the material or working properties to be expected of rolled strip 15 as a function of a standard roll-pass plan 10, chemical analysis values 12 of rolled strip 15 and settings ascertained for rolling train 16 by an advance calculation 24. Such a structure observer 25 is explained in more detail in FIGS. 3, 4 and 5. Setpoint values 11 for the material or working properties are compared in a comparator 21 to the values ascertained by structure observer 25 for the material or working properties. If setpoint values 11 for the material or working properties and the values ascertained by structure observer 25 for the material and working properties do not agree sufficiently precisely, then path 26 is followed. In accordance with a selected optimization criterion, the operating parameters, in this case input temperature $T_{ein}$, output temperature $T_{aus}$ and the degrees of reduction $\phi_i$ of the individual roll stands are changed in a weighted variation 22. The result of this weighted variation 22 is new setpoint values 23 for temperature $T_{ein}$ of rolled strip 15 at the entry into rolling train 16, for temperature $T_{aus}$ of rolled strip 15 at the exit from rolling train 16, as well as the degrees of reduction pi of the individual roll stands of rolling train 16. On the basis of these setpoint values 23, new settings for rolling train 16 are ascertained in an advance calculation 24. This cycle is run through until values 25 ascertained by the structure observer have the desired degree of agreement with setpoint values 11 for the material or working properties. In this case, path 27 is followed, which sets control elements 17 according to the values ascertained in advance calculation 24. Furthermore, an adaptation 13 of advance calculation 24 is provided, by which models on which advance calculation 24 is based are adapted as a function of measured values from measuring instruments 18 and a post-calculation 14. In an advantageous, alternative refinement, provision is made for the input variables of structure observer 25 to be the operating parameters, i.e., $T_{ein}$, $T_{aus}$ and $\phi_i$ in the present case, instead of the settings calculated in advance calculation 24 for rolling train 16.

Provision can likewise be made to use a structure optimizer corresponding to FIG. 2 to adjust a metallurgical plant composed of a hot rolling train and a cold rolling train, a metallurgical plant composed of a continuous casting installation, a hot rolling train and a cold rolling train, a metallurgical plant composed of a continuous casting installation and a hot rolling train, or a metallurgical plant composed of a continuous casting installation, a rolling train and a cooling section. For this purpose, appropriately expanded structure observers and a suitably increased number of operating parameters should be used. The present invention is also suitable for adjusting a rail rolling track section.

It is particularly advantageous to optimize further parameters, such as energy consumption or roll wear, simultaneously using structure optimizer 20.

Figure 3:
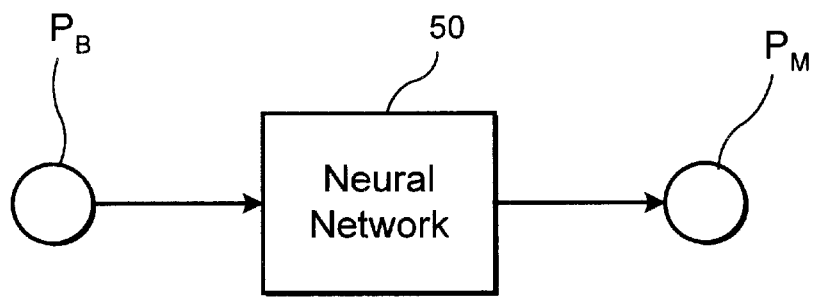
FIG. 3 shows a structure observer.
Figure 4:
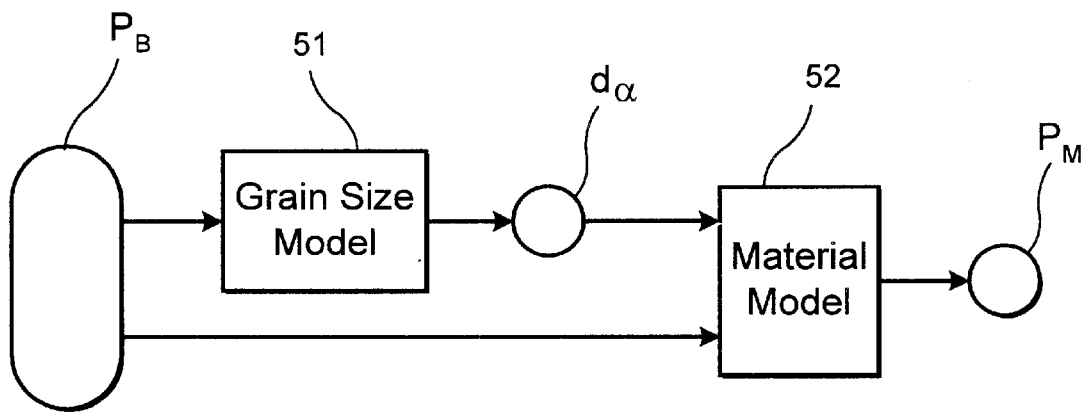
FIG. 4 shows an alternative embodiment of a structure observer.
Figure 5:
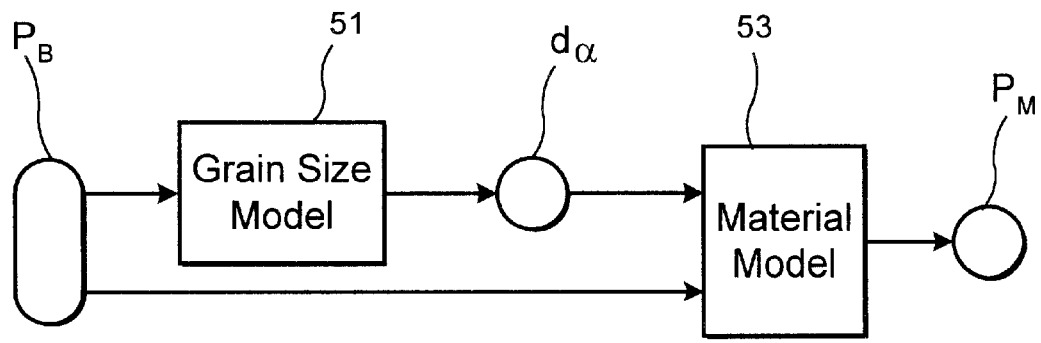
FIG. 5 shows a further alternative embodiment of a structure observer.

FIGS. 3, 4 and 5 show advantageous embodiments for a structure observer 25 from FIG. 2. In FIG. 3, $P_B$ designates the operating parameters and PM the material or working properties of a steel or aluminum. Reference numeral 50 designates a neural network which ascertains material or working properties $P_m$, such as yield point, proof stress, tensile strength, elongation at fracture, hardness, transition temperature, anisotropy and/or consolidation index as a function of operating parameters $P_B$. A neural network is described in for example German patent application DE 197 38 943.

FIG. 4 shows an alternative embodiment of a structure observer. This structure observer has a grain size model 51 and an analytical material model 52. Details of this model can be learned from for example the article "*Recrystallization and grain growth in hot rolling*", by C. M. Sellers and J. A. Whiteman, Material Science, March/April 1979, pages 187 through 193. Grain size model 51 ascertains the ferrite grain size $d_a$ in the case of uncrystallized or only partly crystallized austenite as a function of operating parameters $P_B$. Material model 52 ascertains material or working properties $P_M$ as a function of the ferrite grain size $d_a$ in the uncrystallized or only partly crystallized austenite, as well as of operating parameters $P_B$. Operating parameters $P_B$, which are used as input variables for grain size model 51 and material model 52, are not necessarily identical. It is possible for different operating parameters to be used as input variables.

FIG. 5 shows a structure observer corresponding to FIG. 4, analytical material model 52 being replaced by a neural network 53. Such a neural network 53 can be designed, for example, as described in for example German patent application 197 38 943, the ferrite grain size $d_a$ in the uncrystallized or only partly crystallized austenite being provided as an additional input variable for the neural network described in for example German patent application 197 38 943.

Genetic algorithms can advantageously be used for the iterative determination of optimal setting or optimal operating parameters by a structure optimizer 20 according to FIG. 2.

Figure 6:
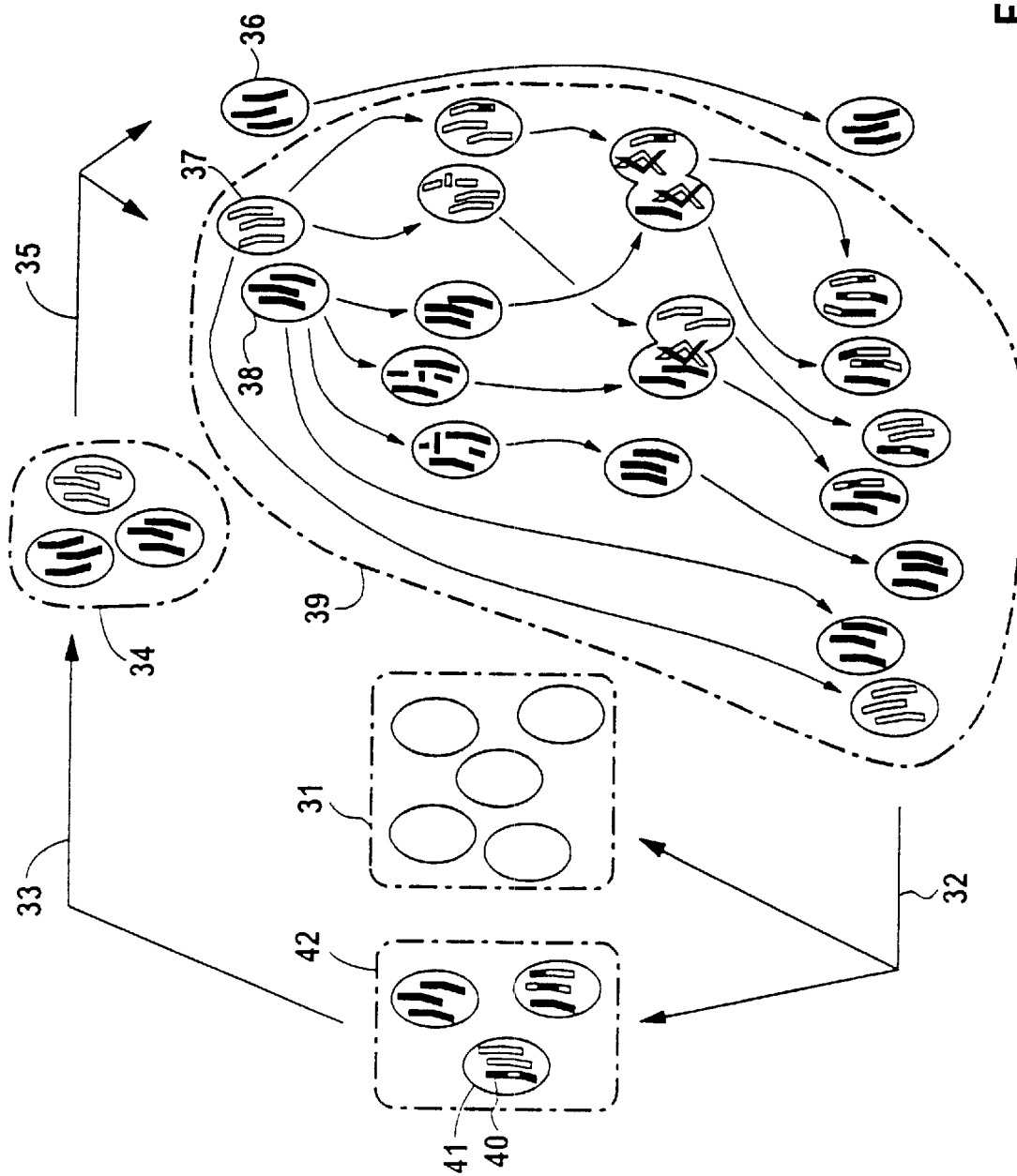
FIG. 6 shows the use of genetic algorithms in a structure optimizer.

FIG. 6 shows in simplified form the procedure in the optimization with the aid of genetic algorithms. The optimization is carried out in such a way that values for the parameters to be optimized are arranged in so-called genes 40 which, in turn, are assigned to individuals 41 of a so-called population;

that a specific number of individuals 41 forms a socalled initial population;

that a few or all of the values in the genes are changed by a random value, in particular a random value from a selection of normally distributed random numbers, so that the result is a changed population 34 (step 33 in FIG. 6);

that genes belonging together are combined on so-called chromosomes, which are inherited together during recombination;

that the individuals with their genes, i.e., the values for the corresponding parameters, are assessed by an optimization function; and that based on this assessment (step 32 in FIG. 6), individuals are selected for a new population, statistical preference being given to individuals that satisfy the optimization function better than other individuals;

that remaining individuals 31 are no longer taken into account;

that the optimization cycle is repeated with new population 41 until a solution considered to be optimal is reached.

Transferred to the iteration loop in structure optimizer 20 illustrated in FIG. 2, the step 32 in FIG. 6 is implemented in comparator 21, and the assessment is implemented in structure observer 25 in FIG. 2. Steps 33 and 35 in FIG. 6 are implemented in weighted variation 32 in FIG. 2. The parameters combined into the genes correspond, for example, to operating parameters $T_{ein}$, $T_{aus}$ and $\phi_i$ in FIG. 2. It is particularly advantageous to include further parameters, in particular optimization criteria such as energy consumption or roll wear, in the optimization. The genes which correspond to these parameters must be provided accordingly. The further parameters are then optimized at the same time as the operating parameters.

What is claimed is:

1. A process for controlling a rolling mill of a metallurgical plant for producing a rolled strip of steel or aluminum, the steel or aluminum having specific material properties that depend on structure properties of the steel or aluminum produced in the metallurgical plant from input materials, the material properties being a function of operating parameters of the plant, the method comprising:

continuously determining the structure properties of the steel or aluminum during the production by iteratively determining said properties;

determining the operating parameters of the plant as a function of desired material properties of the steel or aluminum and the continuously determined structure properties; and utilizing measuring instruments for measuring specific states in a rolling train.

2. The process according to claim 1, further comprising:

using a degree of reduction during a deformation of the steel or aluminum through roll stands as one of the operating parameters for adjusting changes in the structure properties.

3. The process according to claim 1, wherein the desired material properties includes at least one of: yield point, proof stress, tensile strength, elongation at fracture, hardness, transition temperature, anisotropy and consolidation index of the steel or aluminum.

4. The process according to claim 1, further comprising:

optimizing energy consumption of the plant using the operating parameters.

5. The process according to claim 1, wherein the determining step includes determining the operating parameters of the plant using genetic algorithms as a function of desired material properties of at least one of semifinished and finished product of steel or aluminum.

6. A device for controlling a rolling mill of a metallurgical plant for producing a rolled strip of steel or aluminum, the steel or aluminum having specific material properties that depend on structure properties of the steel or aluminum produced in the plant from input materials, the material properties being a function of operating parameters of the plant, the device comprising:

a structure optimizer continuously detecting iteratively the structure properties of the steel or aluminum during production and determining the operating parameters as a function of the detected structure properties and desired material properties, and measuring instruments for measuring specific states in a rolling train.

7. The device according to claim 6, wherein the structure optimizer includes a structure observer.

8. The device according to claim 6, wherein the structure optimizer is operated using neural networks.

9. The device according to claim 6, wherein the structure optimizer utilizes genetic algorithms.

10. The device according to claim 6, further comprising:

an iteration arrangement, the structure optimizer continuously and iteratively determining the operating parameters using the iteration arrangement.

* * * * *